(12) United States Patent
Bailey

(10) Patent No.: US 8,310,481 B2
(45) Date of Patent: Nov. 13, 2012

(54) COMPUTER AIDED DESIGN METHOD FOR ENHANCEMENT OF LOCAL REFINEMENT THROUGH T-SPLINES

(76) Inventor: Edward Ernest Bailey, Westampton, NJ (US)

( * ) Notice: Subject to any disclaimer, the term of this patent is extended or adjusted under 35 U.S.C. 154(b) by 904 days.

(21) Appl. No.: 12/287,627

(22) Filed: Oct. 10, 2008

(65) Prior Publication Data

US 2009/0237399 A1 Sep. 24, 2009

Related U.S. Application Data

(60) Provisional application No. 60/979,498, filed on Oct. 12, 2007.

(51) Int. Cl.
*G06T 17/00* (2006.01)
(52) U.S. Cl. ........ 345/420; 345/419; 345/441; 345/581; 345/660; 345/672; 345/679
(58) Field of Classification Search .................. 345/419, 345/420, 581, 660, 672, 679, 441
See application file for complete search history.

(56) References Cited

U.S. PATENT DOCUMENTS

| | | | |
|---|---|---|---|
| 5,576,778 A * | 11/1996 | Fujie et al. ..................... | 351/177 |
| 6,037,949 A | 3/2000 | DeRose et al. | |
| 6,198,979 B1 | 3/2001 | Konno | |
| 6,401,042 B1 * | 6/2002 | Van Riel et al. ................ | 702/17 |
| 6,476,804 B1 | 11/2002 | Cosabel | |
| 7,058,217 B2 * | 6/2006 | Thornber et al. ............. | 382/154 |
| 7,174,280 B2 | 2/2007 | Stewart et al. | |
| 7,274,364 B2 | 9/2007 | Sedeberg | |
| 2004/0150643 A1 | 8/2004 | Borshukov | |
| 2006/0098008 A1 | 5/2006 | Holberg | |
| 2006/0098161 A1 | 5/2006 | Dumage et al. | |
| 2007/0219760 A1 | 9/2007 | Yang et al. | |
| 2007/0222793 A1 | 9/2007 | Olhofer et al. | |
| 2008/0162090 A1 | 7/2008 | Perry et al. | |

OTHER PUBLICATIONS

Wang; Lazhu et al.; "Coons type blended B-spline (CNSBS) surface and its conversion to NURBS surface"; 1997; Computer & Graphics, vol. 21, No. 3, pp. 297-303.*
Ipson; Heather; "T-Spline Merging"; Apr. 2005, Department of Computer Science Brigham Young University.*

(Continued)

*Primary Examiner* — Xiao M. Wu
*Assistant Examiner* — Todd Buttram
(74) *Attorney, Agent, or Firm* — Edam Law PLLC; Edmar A. Amaya, Esq.

(57) ABSTRACT

One embodiment of the present technology provides a the method comprises the steps of: Converting B-spline networks to T-splines, Converting NURBS into T-spline surfaces, Adding control points to local regions, Scaling or optimizing weights across the mesh, and merging between NURBS and T-spline surfaces. The technology overcame some of the issues with implementing simultaneous multiple surface design methodology when dealing with groups of lenses and reflectors, by improving seed patch junction continuity, elimination of ripples and holes, and precisely adding control points where required. In at least one embodiment of the technology, the t-splines topology allowed for refined control over the optical surface. Control points were reduced by conversion of a NURBS into a T-spline. T-splines were used to produce new loft lenses which were further refined and merged to spline patches. In another embodiment of the present technology, the T-spline loft lens network was subsequently optimized through reverse raytracing, bi-directional raytracing, flow-line, optical path, or flux tube approach.

10 Claims, 7 Drawing Sheets

OTHER PUBLICATIONS

Song et al., "Free-form Deformation With Weighted T-Spline," Department of Mathematics, Zhejiang University, Hangzhou, China.

Zeng et al., "Adaptive T-Spline Surface Fitting to Z-Map Models," School of Computer Engineering, Nanyang Tech. University, Singapore.

Belyaev A., "Uniform B-splines. Subdivision," http://eee.mpi-sb.mpg.de/~belyaev.

Sederberg et al., "T-spline Simplification and Local Refinement," Computer Science Department, Brigham Young University, Provo, UT.

Sederberg et al. "T-splines and T-NURCCs", Computer Science Department, Brigham Young University, Provo, UT.

Casciola et al., "Ageneralized conversion matrix between non-uniform B-spline and Bezier representations with applications in CAGD" Dep. of Math. Univ. Bologna, Italy Jul. 29, 2004.

\* cited by examiner

COMPUTER AIDED DESIGN METHOD FOR ENHANCEMENT OF LOCAL REFINEMENT THROUGH T-SPLINES

CROSS REFERENCE TO RELATED APPLICATION

This application is a non-provisional application which claims the benefit of priority under 35 U.S.C Section 119 from U.S. provisional application "BEYOND NURBS: ENHANCEMENT OF LOCAL REFINEMENT THROUGH T-SPLINES" No. 60/979,498 filed Oct. 12, 2007.

FIELD OF THE TECHNOLOGY

The disclosure relates to the art of Computer Aided Graphic Design, in particular to Non-Uniform Rational B-Splines, T-splines and T-NURCC in free-form design, in order to accelerate local refinement by simplifying control point addition allowing the CAD designer to increase control surface detail where needed.

BACKGROUND OF THE TECHNOLOGY

The optical design community has progressed in parallel with the advancements of computer aided design (CAD) and computer aided geometry design (CAGD) for many years. As computer aided design has progressed from simple curves, conics, and aspheric polynomials the applications have transitioned to optical design shortly thereafter or in parallel. Many problems in computer aided design allow for error many orders of magnitude higher than those tolerances allowed in optical design. The optical design community following its own relentless pursuit of diffraction limited performance and has pushed transversely to improve computer aided design to higher levels of precision. Gradually, more difficult optical problems have required creativity to push computer aided design further into the realm of optical design code. There are typically resistances to do so as the mathematics concerning simple curves, and aspherics, the associated wavefronts and aberrations is well understood. Metrology to inspect such advanced geometries also has to come up to speed in parallel, otherwise design realized on the computer cannot be verified with empirical data to ensure that what was designed was indeed manufactured precisely.

Many designers were the most resistant to embracing the computer-aided design world largely due to limitations in the free-form design space. The entertainment and defense industries with vast monetary resources has pushed the realization of more general design tools to the computer design space. The parametric mathematics has progressed from Bernstein polynomials, to Bezier curves, B-splines, and then tensor product surfaces or NURBS (Non-Uniform Rational B-Splines). Computer aided geometry design today is largely dominated by NURBS and sub-division surface modeling. In an effort to advance local refinement and free-form deformation T-splines are introduced as a new generalization of NURBS. To fully appreciate the advancement it is necessary to compile comparisons between the two topologies, the mechanics of knot-insertion/deletion, and how the non-imaging and imaging community may become beneficiaries of the application.

In the optical design arts for example, it would be desirable to progress from simple spherical control surfaces to conics and aspherics before entering the t-spline lens space. In some applications a merit function can be achieved with sequences of simple spherical surfaces. In many non-imaging applications which require tailoring the light emanating from an extended source spherical surfaces offer insufficient optical control. Progressing to a NURBS surface or spline patch grid surface presents challenges.

Control of the light at a local control point can be performed by iterative Cartesian oval calculations, but it is a tedious process with so many superfluous control points in close proximity to a local surface change. If one desires to add control perturbation to a section in-between the surface spline control points knot insertion produces exponentially greater complexity. Trying to add one knot at an optical control surface section of interest requires adding an entire row of control points to satisfy the rectangular NURBS grid topology.

One way to locally refine is to trim the NURBS with a cutting surface and then add control points. Joining additional surfaces to the trimmed NURBS becomes a problem and rips can frequently occur. For some models the rips and discontinuities at a NURBS junction can be ignored due to coarse machine tolerances. Rips and gaps however, produce problems for efficient and accurate optical raytracing, requiring post-process healing, and iterative surface approximation routines. These rips are more likely to occur when attempting to merge bezier edge curves with dissimilar continuity.

For the foregoing reasons, there is a need in the optical design industry to develop a method to refine geometries without the addition of superfluous control points.

There is also a further need to develop a method for interoperability between NURBS and T-splines surfaces for optical design that will accelerate adaptation allowing for compatibility with opto-mechanical software, tooling, and manufacturing.

BRIEF SUMMARY OF THE TECHNOLOGY

The present technology provides a method for tensor product surface local refinement through T-spline networks for CAD designs.

BRIEF DESCRIPTION OF THE SEVERAL VIEWS OF THE DRAWINGS

The foregoing summary, as well as the following detailed description of the technology, will be better understood when read in conjunction with the appended drawings. For the purpose of illustrating the technology, there are shown in the embodiments which are presently preferred. It should be understood, however, that the technology is not limited to the precise arrangements and instrumentalities shown. In the drawings.

DESCRIPTION OF THE TECHNOLOGY

It shall be understood to the person skilled in the art that "NURBS" refers to Non-uniform rational B-spline which is a mathematical model used in computer graphics for generating and representing curves and surfaces. B-splines are a way of defining a group of degree n Bezier curves that works irrespective of control point location and joins with $C^{(n-1)}$ continuity. The formula describing the Bezier curve is:

$$P(t) = \sum_{i=0}^{n} \binom{n}{i}(1-t)^{n-i}t^i P_i.$$

The formulation of the Bezier curve equation consists of the ith Bernstein polynomial up to degree n in which the parametric variable t stitches the space between the points $P_i$. B-splines such as in 510 have local control as inserting a knot only requires updating the few nearby control points of the n degree curve segments. Families of B-splines 510 form NURBS surfaces 120.

It shall be further understood to the person skilled in the art that tensor product surfaces are formulated from B-spline or Bezier blending functions and include control points and weights:

$$P(s,t) = \frac{\sum_{i=0}^{m}\sum_{j=0}^{n} w_{ij} P_{ij} B_i^m(s) B_j^n(t)}{\sum_{i=0}^{m}\sum_{j=0}^{n} w_{ij} B_i^m(s) B_j^n(t)}$$

Figure 1:
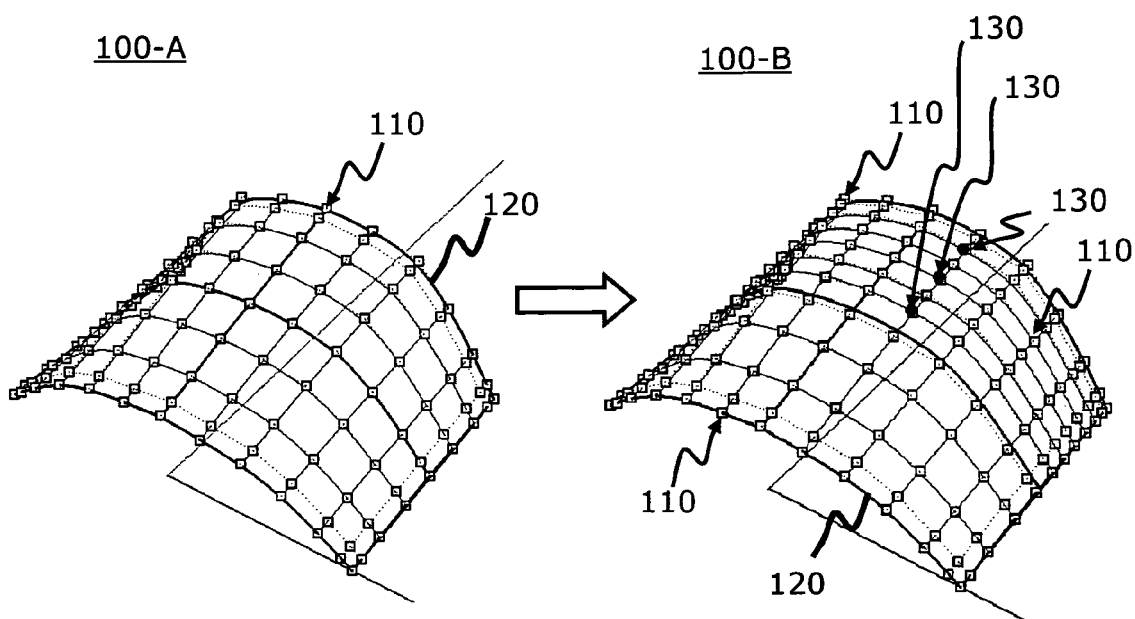
FIG. 1 depicts a NURBS surface described with (117) one hundred seventeen control points increases to (156) one hundred fifty-six with the addition of only three knots which constitutes a 33% increase.
Figure 2:
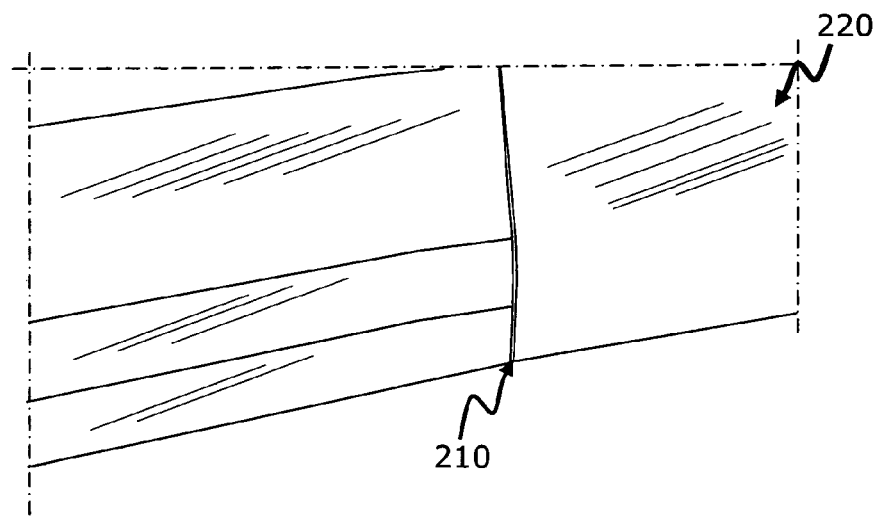
FIG. 2 depicts a "rip" shown at the junction of two trimmed NURBS.

Knot insertion is difficult for a tensor product B-spline surface because adding one knot 130 requires adding an entire column or row of control points 110 as shown in FIG. 1. Local refinement through knot 130 insertion is possible through Boehm's algorithm which operates on the B-spline coefficients, by the Oslo algorithm which computes subspace discrete B-splines, and through the blossoming principle devised by Goldman. On the other hand, knot 130 removal is not always possible without disrupting the geometry. Knot 130 removal without disruption can only occur when the two adjacent curve segments are at a continuity level greater than the difference between the curve degree and multiplicity of the knot.

Figure 3:
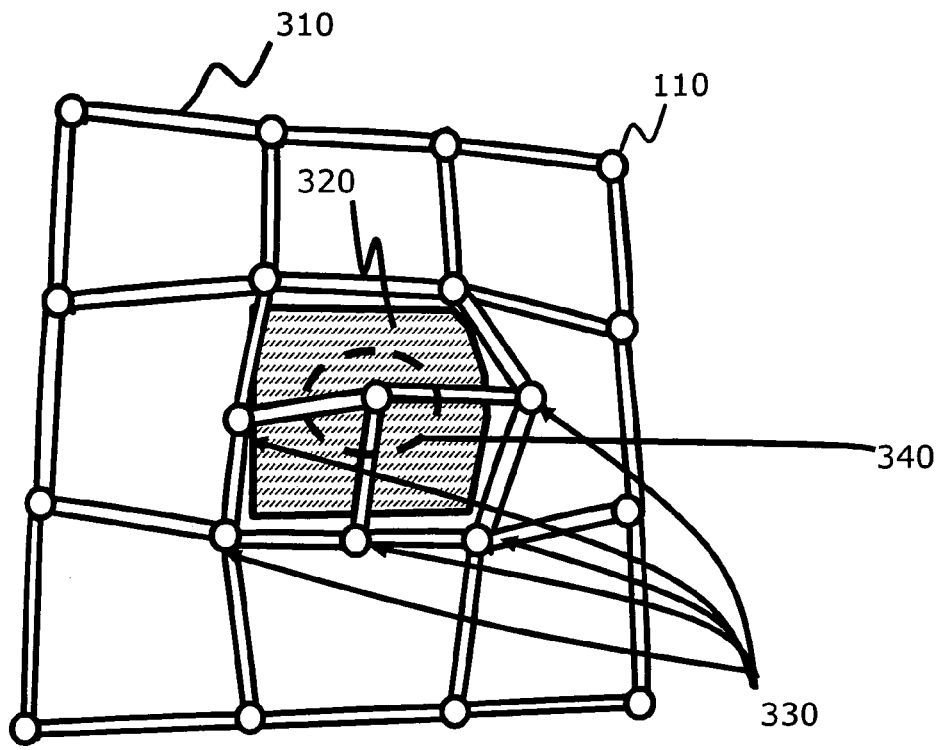
FIG. 3 depicts a T-spline control grid or control point lattice, with T-junctions and a T-spline surface.
Figure 4:
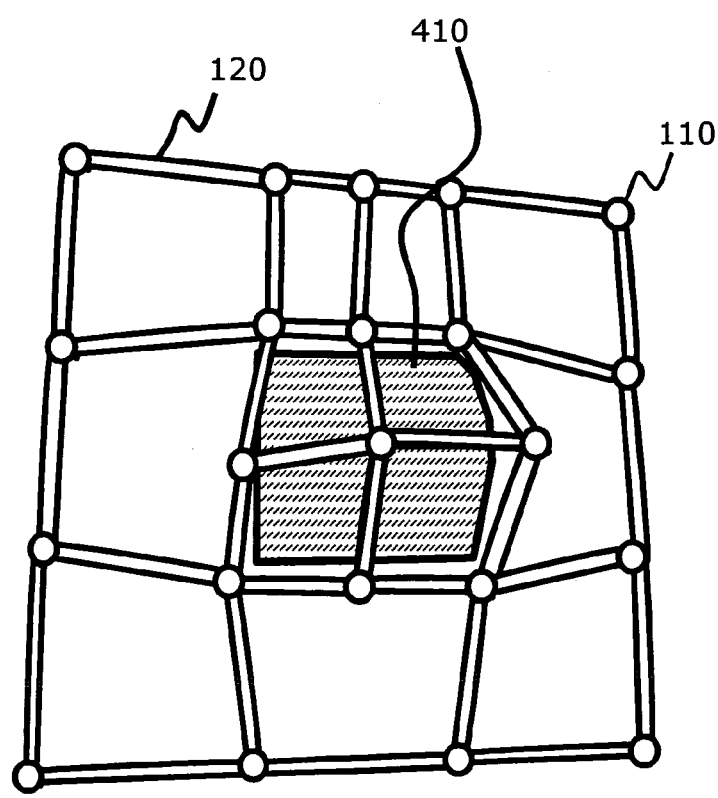
FIG. 4 depicts a NURBS surface with a rectangular control point mesh.

As depicted in FIG. 3 T-spline control grids 310 or control point lattice 310, permit T-junctions 340, so lines of control points 110 need not traverse the entire control grid as seen in FIG. 4. T-splines support many valuable operations within a consistent framework, such as local refinement, and the merging of several B-spline surfaces that have different knot vectors into a single gap-free model. A T-spline surface 320 which is comprised of a control point lattice 310 is also called a T-mesh 310. In the optical design arts, a control point lattice 310 becomes an optical control surface 720.

Figure 7:
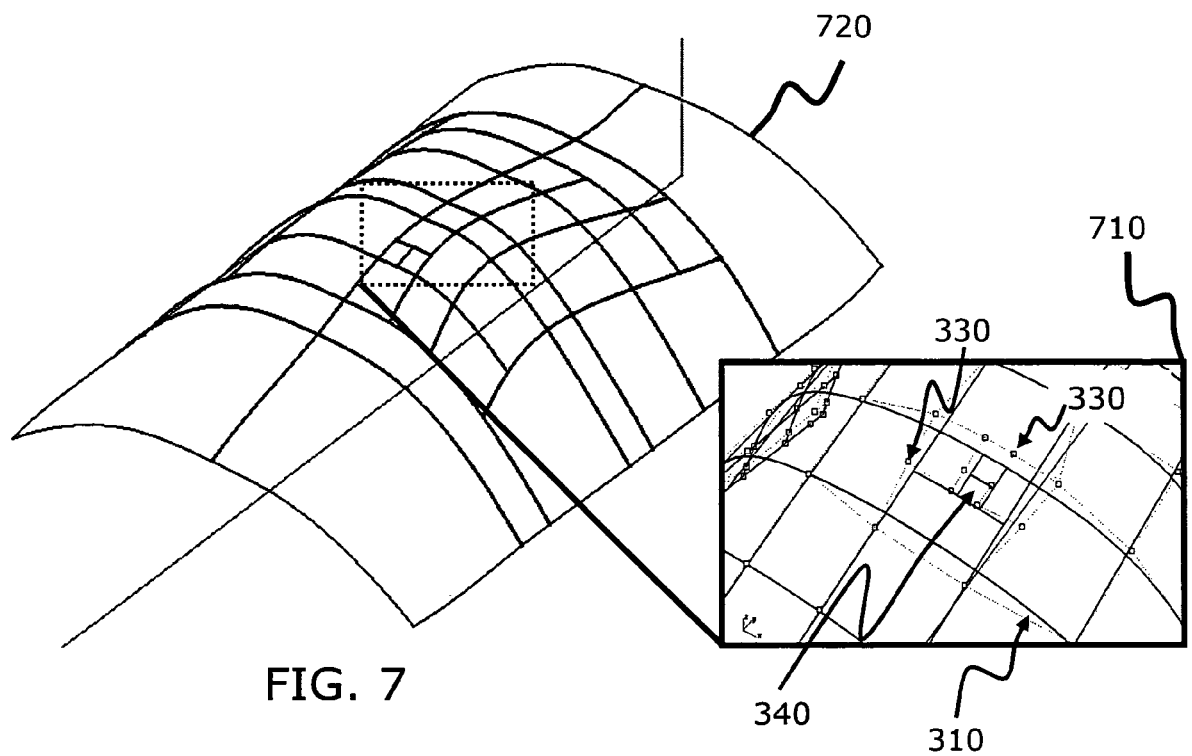
FIG. 7 depicts an embodiment of the technology, with a T-spline network representation comprised of only (35) thirty five starting control points. Beginning with only the essential control points allows for local knot insertion at important areas.

A T-spline optical control surface such as the one in FIG. 7 can be described as follows:

$$P(s,t) = (x(s,t), y(s,t), z(s,t), w(s,t)) = \sum_{i=1}^{n} P_i B_i(s,t)$$

in which a T-spline mesh consists of a group of control points 110, the weights of the points, a T-mesh 310, and a neighborhood or network of points 330 on the T-spline surface 320. The coordinates of such points 110 and 330 in Cartesian space are defined as:

$$\frac{\sum_{i=1}^{n}(x_i, y_i, z_i)B_i(s,t)}{\sum_{i=1}^{n} w_i B_i(s,t)}$$

The blending function Bi(s,t) is given by N[si0,si1,si2,si3,si4](s) N[ti0, ti1, ti2, ti3, ti4](t) where N[si1 . . . 4](s) is the B-spline basis function for the knot vector: si=[si0 . . . 4] and N[ti0 . . . 4](t) is defined by the knot vector ti=[ti0 . . . 4].

In the optical design and computer modeling arts, the limitation with NURBS in FIG. 1 is that the location of the control point is likely not where the bad skew ray has passed, and a change to the control point may disturb the rays propagating in the correct directions. A light wavefront containing many skew rays produces local caustics during propagation and is historically difficult to control. T-splines of FIG. 3 and as applied in FIG. 7, enables the local refinement of the optical control region where local ray bundles exhibiting undesirable direction cosines are corrected without changing the propagation of the rays with good behavior.

Another optimization limitation traditionally encountered in the optical designs of lenses, reflectors, and diffractive elements is with regards to rotational symmetry. For example, an optimizer typically cannot traverse from a symmetric revolved Spline lens or reflector to a non-rotationally symmetric bi-directional polynomial or tensor product NURBS 120 patch network such as in FIG. 1. When converting from an easily optimizable geometry to a more general topology, it would be advantageous to lock geometric regions which are well defined in terms of light behavior and where ray direction cosines meet the design requirements and to add local refinement only to regions exhibiting anomalous ray path behavior 123. T-splines such as in FIG. 12, offer the dissimilar continuity merge of FIG. 9, and local refinement tools required to open up optimization potential as such it can be constituted "enhanced free-form" or EFF as traditional "free-form" designs such as in FIG. 13 are constrained to either subdivisional catmull-clark or NURBS topologies.

Figure 9:
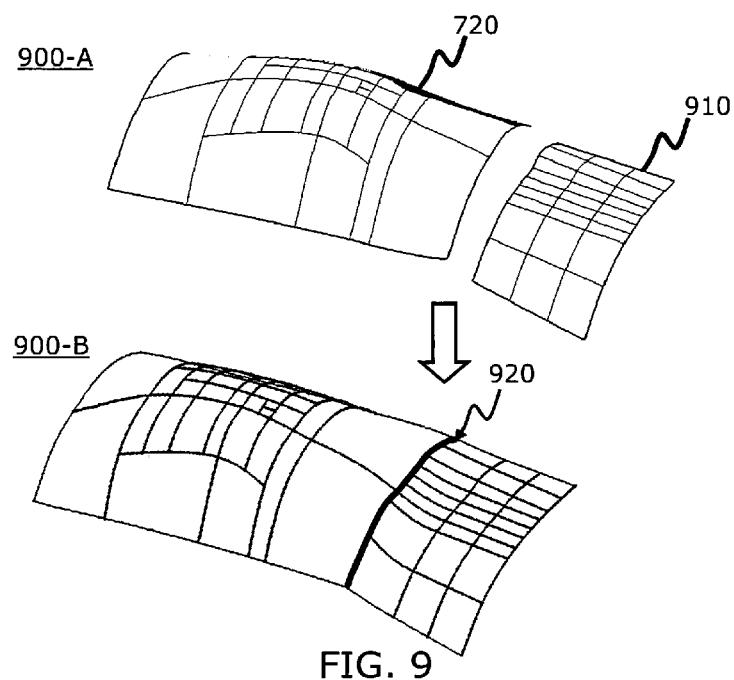
FIG. 9 depicts an embodiment of the technology, where a "rip"-free merge was produced between dissimilar NURBS to T-spline loft lens parameterizations.
Figure 10:
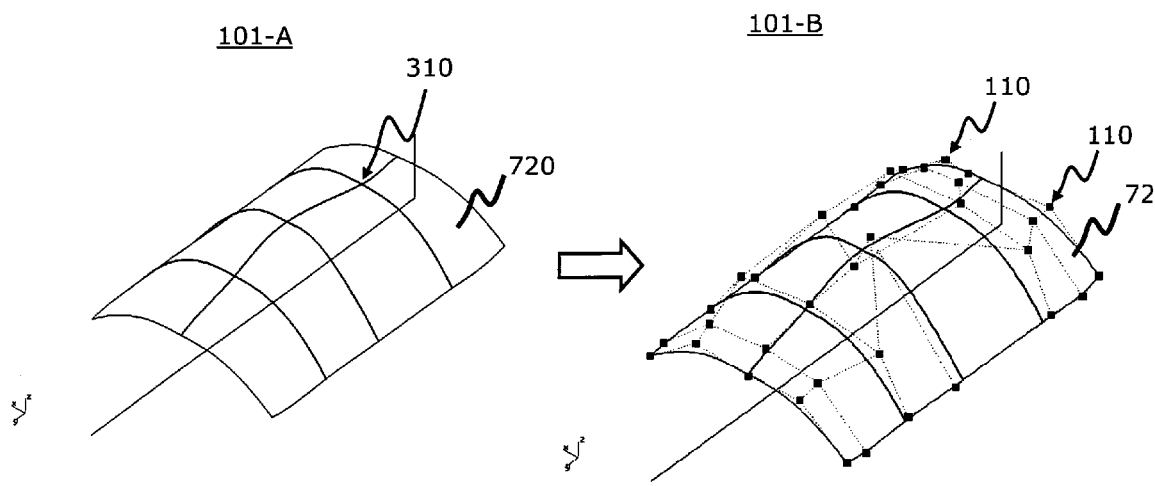
FIG. 10 depicts an embodiment of the technology, where a T-spline optical control surface was produced from a curve network and its equivalent T-spline optical control surface with a total of (35) thirty-five control points.
Figure 12:
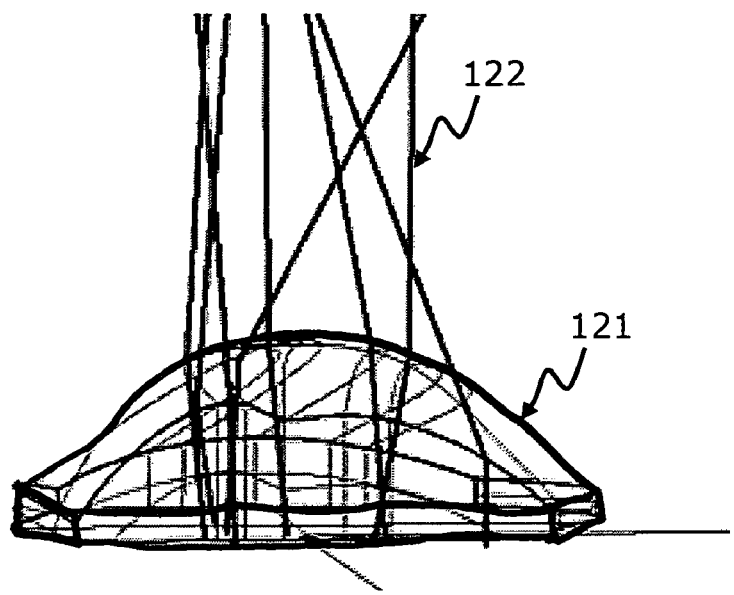
FIG. 12 depicts an embodiment of the technology, where a T-spline lens controls the refraction of the light rays, in which the rays represent the wavefront of light.
Figure 13:
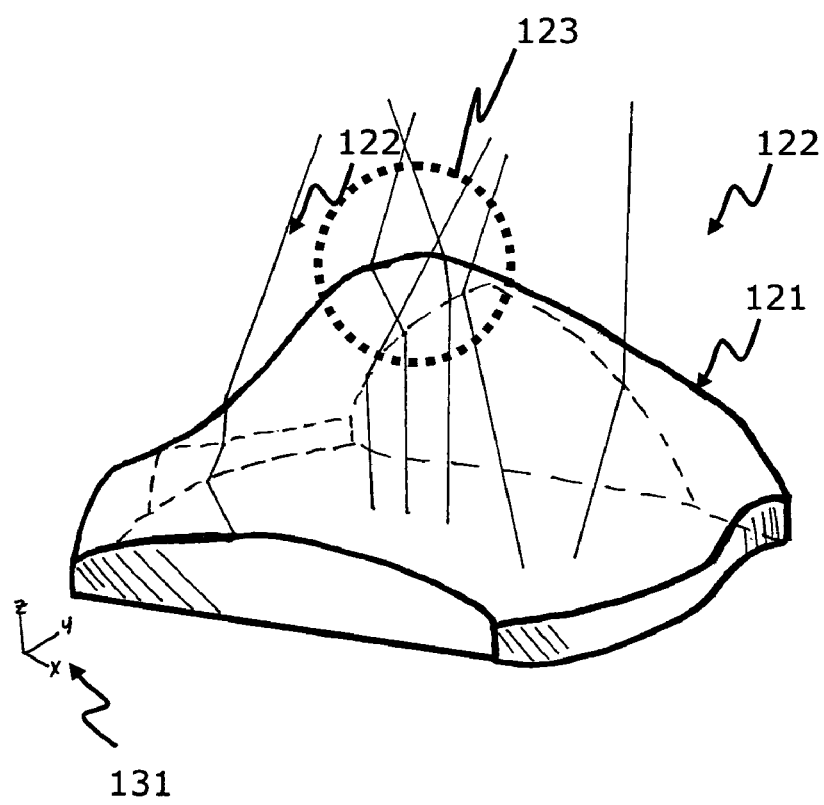
FIG. 13 depicts an embodiment of the technology, where a T-spline light control lens operates upon the light in 3D in which the lens is comprised of T-panels or T-junction local light refinement surfaces.

The disclosed technology eliminates the aforementioned challenges of localized refinement to perturb ray-paths 122 or to design optics as in FIG. 9, FIG. 12 and FIG. 13 with fine structure not attainable with NURBS. The technology uses knot-addition 330, and reverse ray-tracing localization. Identifying the light control regions of interest occurs in a b-directional manner in which rays are forward raytraced direct from the source through the light control surfaces to a receiver plane. Receiver mesh regions detecting the highest density of anomalous light behavior then becomes a second raytrace source in which the direction cosines are inverted. The localized region on the receiver mesh grid then propagates rays back towards the light control surface. The light control surfaces become surface receivers and the local refinement regions are identified which have the highest probability of correcting the ray behavior. Control knots, points, and weights near the local light control region are added through the T-spline local refinement technique. Forward raytracing then verifies the ray path correction. Additional cycles of forward and reverse raytracing may be necessary to correct a light bundle containing complex caustics. The technology further advantageously produces the T-Junction 340 by launching at least one tangent ray. Yet another advantage of the technology is that it allows an optimizer to progress from simple geometric entities to more complex geometry. Traditionally an optical geometry optimizer will only operate on the lens entity prescription chosen. For example, an aspheric lens will not convert to an exact B-spline lens replication after exhausting refinement of the highest order aspheric term.

Figure 11:
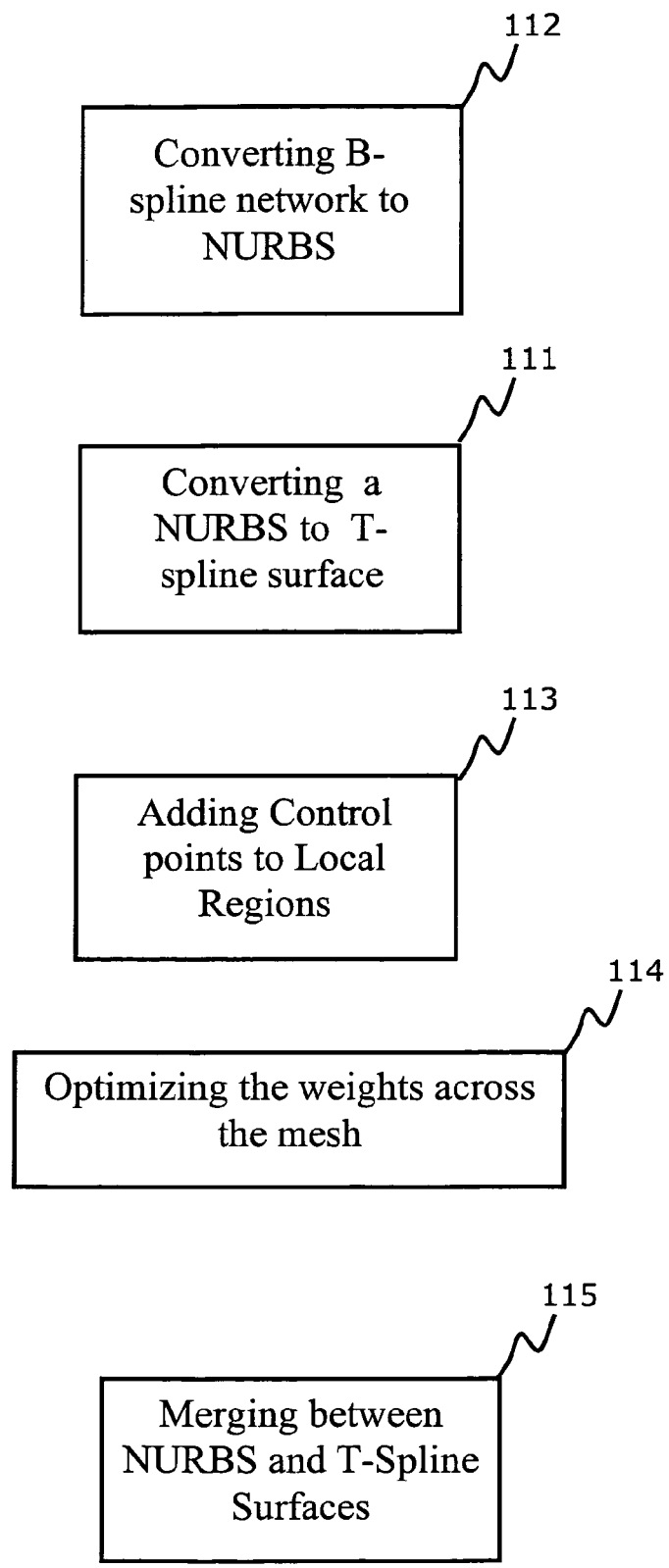
FIG. 11 depicts a method of the technology for tensor product surface interpolation of NURBS and T-splines networks.

FIG. 11 depicts at least one preferred method of the disclosed technology, it is understood that the order of the elements may vary as the technology is understood to the person skilled in the art, the method comprises the steps of: Converting B-spline networks to NURBS 112, Converting NURBS into T-spline surfaces 111, Adding Control Points to local regions 113, Scaling or Optimizing weights across the mesh 114 in terms of flux density or in the alternative the geometry gradient, and merging between NURBS and T-spline surfaces 115. Additionally it is advantageous to begin with either a B-spline curve network or a powell-sabin spline network and then converting the loft curve network directly to a t-spline surface or solid directly without the intermediate NURBS conversion step.

It should be further understood to the person skilled in the art, that the aforementioned process is comprised of a series of steps that are performed on or with the aid of a computer. The described technology uses the transformation of data produced by different mediums including but not limited to, data input devices such as laser, keyboard, mouse, optical reading, manual input of coordinates, scanning devices, tablets and sensors. The technology methodology further manipulates the data in the CAD software which includes but is not limited to B-Splines, T-Splines, T-NURCC, NSS, NURBS, and D-NURBS along with its complementary algorithms. The technology further produces at least a useful, concrete, and tangible result which is the modeling of surfaces of at least (1) one dimension.

Figure 5:
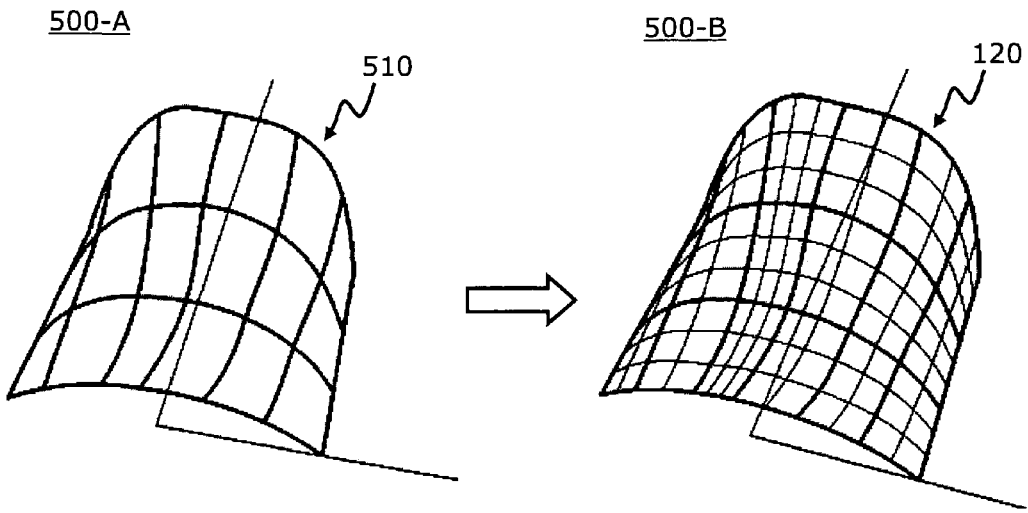
FIG. 5 depicts an embodiment of the technology, where a B-spline network is converted to a NURBS surface.

FIG. 5 depicts one element 112 of the described technology. A B-spline network 510 is converted to NURBS 120, said conversion produces the classic NURBS rectangular grid topology as shown in 100-B. The conversion maybe made by at least one, but not limited to the algorithms described by Boehm, Sablonniere, de Casteljau, Ramshaw; Casciola et al and Prautzsch et al.

Figure 6:
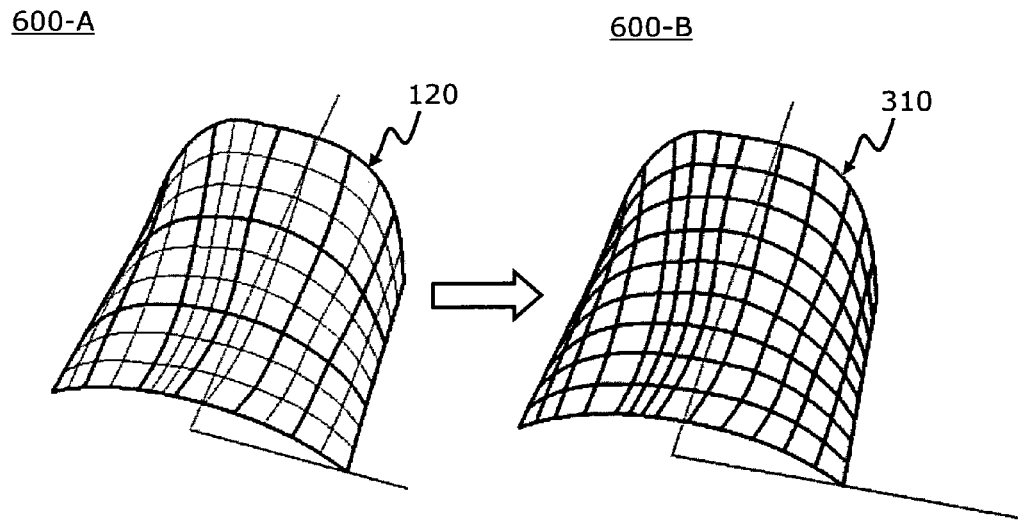
FIG. 6 depicts an embodiment of the technology, where NURBS network is converted to T-spline network.

FIG. 6 depicts another element 111 of the described technology where a B-Spline curve network 120 is converted to a T-spline network 310. A NURBS mesh 120 can be converted to a T-spline mesh 310 and vice versa without loss and advantageously precludes knot insertion control point redundancies such as the ones found in FIG. 1. FIG. 6 depicts at least one example of bi-directional NURBS/T-spline conversion. This approach was investigated, and although preferred, is not limited to NURBS and T-Splines, it could also comprise; T-NURCC, NSS, and D-NURBS. The conversion may be made by at least one, but not limited to the algorithms described by Sederberg, Zheng, Lyche, Belyaev, and Song et al.

The NURBS was advantageously converted to a T-spline surface 320 to avoid the superfluous NURBS knot insertion depicted in FIG. 1. The total number of control points was reduced in many cases by up to 60% representing the same geometry. Conversion to a T-spline surface occurred at the final stage of optical design where the specification cannot be met without free-form local control point manipulation. An advantage of the disclosed technology is that existing global optimization algorithms can operate upon B-spline networks, or B-spline patch surfaces for the first stage of geometry discovery and then locally-refined T-spline surface optimization can finally bring to reality the light control of interest.

Figure 8:
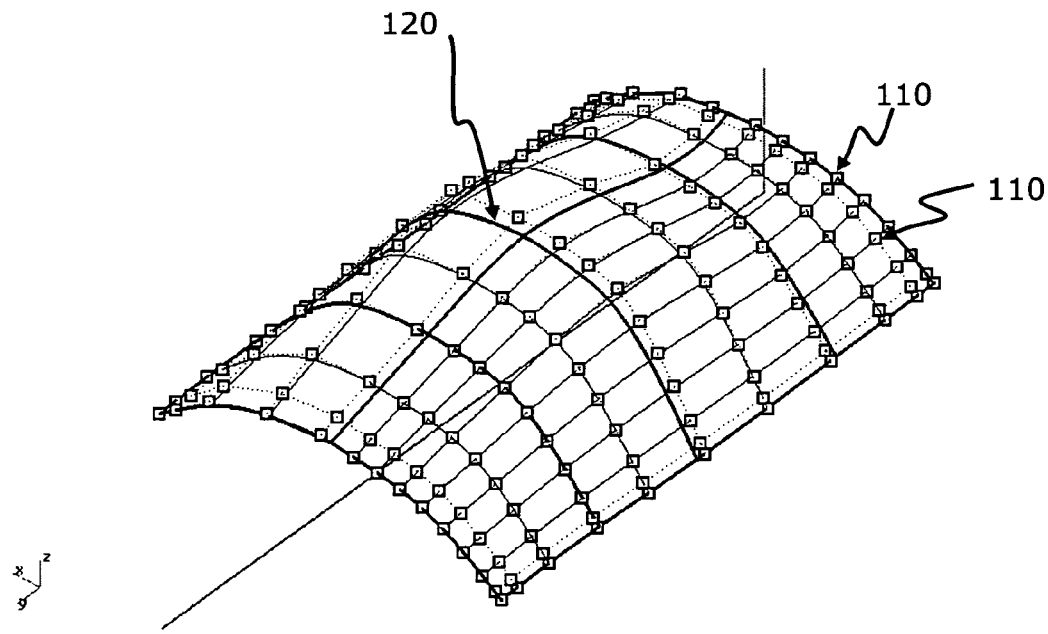
FIG. 8 depicts an embodiment of the technology, where the equivalent geometry of FIG. 7 in a NURBS surface requires (154) one hundred fifty four control points.

After conversion from a NURBS to a T-spline in FIG. 6, control points were then added locally 330, element 113, thus overcoming the NURBS row control point addition problems exhibited in FIG. 1. Yet another advantage of said conversion is to bidirectional pass from NURBS to T-splines, is to advantageously start with a T-spline and then add control points only where needed. 101-A depicts a T-spline optical control surface 720 produced from a curve network. T-spline optical control surface 720 has a total of thirty five (35) control points 110 in contrast to the equivalent geometry in a NURBS of FIG. 8 that requires one hundred fifty four (154) control points. The representation of the same geometry with so many control points gives the false representation of more free-form capability. This is in fact artificial assurance as the location of the control points 110 is constrained to the NURBS rectangular grid 120. In FIG. 7, a T-spline network embodiment of the present technology uses only thirty five (35) starting control points and allows local knot insertion 330 at the importance area 710. Adding optical control power locally where ray density, or geometry gradients are highest, such as in 123 can affect the most change over the incoming extended source wavefront.

By advantageously using T-splines, the present technology not only reduces redundant control points significantly, but also removes tedious ripples 210. These ripples 210 and lack of refined knot 130 placement limits the performance of NURBS lenses such as the one depicted in 900-B. The commonly found wrinkles 210 in the skinned surface patch NURBS 220 can produce problems when implementing traditional simultaneous multiple surface or SMS design. Ripple 210 problems occurs at the seed patch junctions. As depicted in FIG. 9, a T-Spline Loft Lens 720, and a T-spline converted NURBS with different edge parameterization 910 are sometimes needed to form a complex geometric lens. Both the T-spline loft lens and a T-spline converted NURBS 900-A are shown before a rip-free 920 merge operation in 900-B. FIG. 9 depicts how the disclosed technology is used to merge dissimilar parameterizations such as 720 and 910. The T-spline loft lens shown in 720 has local optical control regions as shown at the T-junctions 310. In 910, the T-spline converted NURBS surface has a different edge parameterization. A rip-free 900-B merge was achieved between two dissimilar continuities with minimal superfluous control-point addition.

The optimization element 114 of FIG. 11 was investigated and at least one preferred method was found by using local refinement through the splitting and scaling of the b-spline blending functions in the proximity of the local knot vector. This refinement was made possible because at the local regions of the T-spline control point mesh, weights can be scaled across the mesh in terms of flux density or geometry gradient. As seen in FIG. 13, T-spline optical control surface with ray exit points of interest 123 where control knots are needed for optimum optical modeling and control. The distinguishing characteristic of the T-spline is in the inferred knot vector determination for producing the blending functions through a reference parameter ray. By scaling the blending functions through iterative knot vector projection allows for the new t-junction local refinement technique.

Embodiments of the present technology in FIG. 12 and FIG. 13 depicts accurate raytracing of surfaces that required rapid normal vector search at the dielectric to air, or reflective interface 101. The rays 102 with their associated flux, x,y,z, 131 coordinates, and associated direction cosines are added together as they pass through the receiver grid. An error function was produced by analyzing the evaluated ray properties with those of the merit function or ideal ray bundle model. In this embodiment, the rays 102 formulate approximations of the propagation of the real light wavefronts. In non-imaging optics the skew rays exiting 112 an extended source present a challenge and surfaces must be added in parallel.

The location of the control surface of FIG. 13 was determined by filtering the 3d line segments of the stray rays of control interest and back-propagating to the exact spatial intersections with the optical control surface, changing the optical control surface. The optical control surface can be changed for optimization purposes, but are not limited to; flow-line method, SMS, flux tubes, local edge ray, differential evolution, or orthogonal descent each respectively operating on ray density locations, geometry gradient importance areas or merit function variable matrix discovery, and then ray-tracing again to verify that the perturbation has worked.

In another embodiment of the present technology, the T-spline loft lens 900-B network was subsequently optimized first through a flow-line, optical path, or flux tube approach. Although not preferred, it would be equivalent to a person skilled in the art to use differential evolution and orthogonal descent eliminate the need for calculating derivatives of the merit function for arriving at the primitive T-spline optical light control network skeleton.

A person of ordinary skill in the optical design and computer modeling arts or CAD design may accommodate the optimization element 114 to accomplish a similar result for the same purpose of scaling the mesh using different techniques. Examples of such techniques comprise, but are not limited to: Optical ray-tracing of a t-spline optical control surface whether it is refractive, reflective, or diffractive can lead to improvements in optimization through iterative refinement on the location and number of knots. For example, in an embodiment of the present technology FIG. 12, bundles of rays 122 passing through the optical control surface leave the surface with direction cosines which are undesirable. In FIG. 12, a T-spline light control lens with rays shows several caustic inducing skew rays. The behavior of the exiting wavefronts can be described in any number of ways. In non-imaging optics the merit function will likely be described by, but are not limited to; luminous intensity, illuminance grids, peak intensity, peak illuminance, encircled energy, efficiency of radiant transfer and luminance.

In the disclosed technology, the optical lens design of FIG. 12 and FIG. 13 served as a test case, although many sectors stand to benefit including the multi-disciplinary design. The disclosed technology or manifold T-splines topology may be used when dealing with complex systems which require extended free-form lenses, reflectors, diffractive regions, lightpipes, lightguides, or other light control system operators such as efforts required for solid state lighting fixtures. The technology is also advantageous for modeling lightpipe and lightguides which does not necessarily perform lensing, or reflection in air, it guides light from one location to another. The t-splines topology allows for refined control over the entire optical surface. Control points can be reduced by conversion of a NURBS into a T-spline. T-splines can be used to produce new loft lenses directly from a B-spline network which can then be further refined and merged to spline patches, or T-panels as needed. Several applications such as but not limited to, thermal fin design, propellers or wind-turbine blades, reverse engineering from laser or LIDAR scanned models (used in special effects) and complex industrial design will implement the disclosed technology. Applications requiring complex geometry topology along with any number of the new non-imaging optimization methods will be used.

The disclosed technology and the interoperability of NURBS and T-splines will accelerate adaptation allowing for compatibility with opto-mechanical software, tooling, and manufacturing. Optimization of T-spline lenses may also be accomplished through simplified knot addition and deletion. As disclosed above, T-splines overcame some of the issues with implementing simultaneous multiple surface design methodology when dealing with groups of lenses and reflectors, by improving seed patch junction continuity, elimination of ripples and holes, and precisely adding local control points where required without exponential increase in complexity.

It will be appreciated by those skilled in the art that changes could be made to the embodiments described above without departing from the broad inventive concept thereof. It is understood, therefore, that this technology is not limited to the particular embodiments disclosed, but it is intended to cover modifications within the spirit and scope of the present technology.

What is claimed is:

1. A method, comprising:
refining geometries, by a computer, in at least one optical control lattice by converting at least one B-spline network into a NURBS network, further converting said NURBS network into at least one T-spline network, adding of at least one control point on said T-spline network, and
optimizing of at least one weight across said network; wherein the optimizing step is accomplished by scaling said at least one weight across said network in terms of its flux density, and by
scaling said at least one weight across said network in terms of its geometry gradient.

2. The method of claim 1, further comprising the merging at least one of said NURBS surface with at least one of said T-spline surface.

3. The method of claim 1, wherein said optical control lattice is selected from the group consisting of: optical lens designs, optical reflector designs, extended free form lenses, reflectors, diffractive regions, and loft lenses.

4. The method of claim 1, wherein the optimizing step is selected from the group consisting of: optical ray-tracing, scaling of blending functions, flow-line method, SMS, flux tubes, local edge ray, differential evolution, orthogonal descent on ray density locations, geometry gradient, and merit function variable matrix discovery.

5. A method of optical control surface interpolation comprising the steps of:
converting at least one B-spline surface, by a computer, into at least one NURBS surface; converting at least one NURBS surface into at least one T-spline surface;
merging at least one of said NURBS surface with at least one of said T-spline surface; and
optimizing of at least one weight about said surface; wherein the optimizing step is
accomplished by scaling the weights across said network in terms of flux density, and
geometry gradient.

6. The method of claim 5, wherein said surface contains a control point lattice.

7. The method of claim 6, further comprising the adding of at least one control point on said control point lattice.

8. The method of claim 5, wherein said GAD optical control surface is selected from the group consisting of: optical lens designs, free form lenses, reflectors, diffractive regions, and loft lenses.

9. The method of claim 5, wherein the optimizing step is selected from the group consisting of: optical ray-tracing, scaling of blending functions, flow-line methods, SMS, flux tubes, local edge rays, differential evolution, orthogonal descent on ray density locations, geometry gradient, and merit function variable matrix discovery.

10. A method for refining geometries in an optical control lattice, consisting essentially of:
converting, by a computer, B-splines, Powell-Sabin splines, NURBS, T-NURCC, NSS,
D-NURBS or Bernstein polynomials in to T-spline networks; and
optimizing said T-spline networks by optical ray-tracing, scaling of blending functions,
flow-line method, SMS, flux tubes, local edge ray, differential evolution, orthogonal descent on ray density locations, geometry gradient, or merit functions variable matrix discovery on at least one control point in said T-spline network; wherein the optimizing step is further accomplished by scaling said at least one weight across said network in terms of its flux density, and by scaling said at least one weight across said network in terms of its geometry gradient.

* * * * *